United States Patent
Chen et al.

(10) Patent No.: US 10,452,166 B2
(45) Date of Patent: Oct. 22, 2019

(54) TOUCH DEVICE AND METHOD FOR PERFORMING FINGERPRINT DETECTION ON TOUCH DEVICE

(71) Applicant: SHENZHEN GOODIX TECHNOLOGY CO., LTD., Shenzhen (CN)

(72) Inventors: Weiwen Chen, Shenzhen (CN); Gengchun Deng, Shenzhen (CN); Jinchun Ye, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/548,846

(22) PCT Filed: Jan. 21, 2016

(86) PCT No.: PCT/CN2016/071683
§ 371 (c)(1),
(2) Date: Aug. 4, 2017

(87) PCT Pub. No.: WO2017/071131
PCT Pub. Date: May 4, 2017

(65) Prior Publication Data
US 2018/0224955 A1    Aug. 9, 2018

(30) Foreign Application Priority Data
Oct. 30, 2015   (CN) .......................... 2015 1 0729124

(51) Int. Cl.
*G06K 9/00* (2006.01)
*G06F 3/0354* (2013.01)
(Continued)

(52) U.S. Cl.
CPC .......... *G06F 3/03547* (2013.01); *G06F 1/325* (2013.01); *G06F 1/3215* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 6,408,087 B1* | 6/2002 | Kramer | ............... | G06F 3/03547 345/156 |
| 2007/0253605 A1* | 11/2007 | Maurer | ............. | G06K 9/00067 382/124 |
| 2012/0090757 A1 | 4/2012 | Buchan et al. | | |
| 2013/0135247 A1 | 5/2013 | Na et al. | | |

(Continued)

FOREIGN PATENT DOCUMENTS

| | | |
|---|---|---|
| CN | 102508591 A | 6/2012 |
| CN | 103984485 A | 8/2014 |

(Continued)

OTHER PUBLICATIONS

Abstracts of Foreign References in English.
Abstracts of CN104951159A in English.

*Primary Examiner* — John B Strege
(74) *Attorney, Agent, or Firm* — Ming Jiang; MM IP Services LLC

(57) ABSTRACT

The present disclosure discloses a touch device and a method for performing fingerprint detection on the touch device, wherein the touch device includes: a touch plane configured to receive a user's touch; a detection unit fixed to the touch plane and configured to detect the user's touch; a fingerprint module configured to collect the user fingerprint; a control block, wherein the control block configured to enable the fingerprint module to collect the fingerprint of the user touched on the touch plane when the detection unit that the touch plane is touched by the user.

12 Claims, 10 Drawing Sheets

(51) Int. Cl.
*G06F 1/3215* (2019.01)
*G06F 1/3234* (2019.01)
*G06F 1/3287* (2019.01)
*G06F 3/041* (2006.01)
*G06F 3/044* (2006.01)
*G06F 1/3218* (2019.01)

(52) U.S. Cl.
CPC .......... *G06F 1/3218* (2013.01); *G06F 1/3287* (2013.01); *G06F 3/044* (2013.01); *G06F 3/0416* (2013.01); *G06K 9/00* (2013.01); *G06K 9/00006* (2013.01); *G06F 2203/04105* (2013.01); *Y02D 10/171* (2018.01)

(56) References Cited

U.S. PATENT DOCUMENTS

| | | | |
|---|---|---|---|
| 2014/0270413 A1* | 9/2014 | Slaby | G06F 3/0488 382/124 |
| 2015/0071511 A1 | 3/2015 | Wang | |
| 2016/0171281 A1* | 6/2016 | Park | G06F 1/1643 382/124 |

FOREIGN PATENT DOCUMENTS

| | | |
|---|---|---|
| CN | 104331242 A | 2/2015 |
| CN | 104866406 A | 8/2015 |
| CN | 104951159 A | 9/2015 |
| CN | 204650465 U | 9/2015 |
| CN | 104991721 A | 10/2015 |
| CN | 105224139 A | 1/2016 |
| WO | 0227455 A1 | 4/2002 |

\* cited by examiner

TOUCH DEVICE AND METHOD FOR PERFORMING FINGERPRINT DETECTION ON TOUCH DEVICE

CROSS-REFERENCE TO RELATED APPLICATIONS

The present application is a continuation application of PCT application No. PCT/CN2016/071683 submitted on Jan. 21, 2016, which is based upon and claims priority to Chinese patent application No. 201510729124.8 on Oct. 30, 2015 and entitled "FINGERPRINT RECOGNITION SYSTEM AND METHOD", both of which are incorporated herein for reference in their entireties.

TECHNICAL FIELD

The present invention relates to the technical field of a touch device, and especially relates to a touch device and a method for performing fingerprint detection on a touch device.

BACKGROUND

The fingerprint recognition technique has been widely applied to mobile smart device. Taking a smart phone as an example, the fingerprint recognition has become a main configuration of the smart phone. A pressing-type of fingerprint recognition has gradually occupied the mobile smart device market due to features of small size and high rate of recognition and the like while providing security. Presently, the pressing-type fingerprint recognition chip exists as an individual block, which is applied to a front physical key of the device or is individually arranged on a housing of the device. With the development of the fingerprint recognition technique, a much larger screen proportion and screen space is required in the mobile smart device, and a more humanized unlock experience is also required in the same high security level.

In the screen-integrated fingerprint unlocking modules which are currently available in the market, fingerprint module is hidden under the touch screen, which could provide high screen proportion while maintaining a good effect on the fingerprint unlocking. However, since the fingerprint module is located at the edge of the screen and the location is fixed, the comfort degree of usage is lowered.

An integrated apparatus, in which a fingerprint module and a touch screen or a touch pad are integrated, does not have a fixed detecting button, therefore, when the fingerprint unlocking function needs to be implemented, a physical button or a power button needs to be pressed first to activate the fingerprint module, and then, a finger is pressed on the touch screen or above the touch pad (a certain region or any region of the entire screen) for fingerprint collection, and then the collected fingerprint is received and matched to unlock the device. From the using habit, the entire unlocking process is too long with complex steps, which dramatically lowers the user's experience.

However, if a technique of "Cold Wake Up" is applied to the integrated apparatus, the fingerprint module has to maintain a normal operation state, so as to wait for a user's touch to collect the fingerprint, but enabling the fingerprint scanning function of the entire plane for long time causes relatively high power consumption. In the fingerprint recognition module of the current mobile smart device, the fingerprint unlocking function is implemented by using capacitance sensing. The fingerprint module scans a few pixels in fixed positions with intervals and detects the capacitance variance to achieve the finger touch detection function. A relatively high resolution, generally greater than 300 DPI (dots per inch), is required, and thus the power consumption is relatively high when the fingerprint module scans fingerprint. Therefore, two below problems exist when the "Cold Wake Up" technique for detecting finger touches is applied on the integrated apparatus:

1. High power consumption: the entire area of the touch screen or touch pad is dozens of times of that of an individual fingerprint module. This means that the integrated apparatus in which the fingerprint module and the touch screen or pad are integrated, needs more pixels to participate in the finger touch detection. Thereby, the power consumption becomes higher, and it is impossible to achieve a long time standby detection with low power consumption.

2. Low recognition degree: when the "Cold Wake Up" to detect a finger touch is implemented by capacitance sensing on the basis of less pixels, the sensing of finger presses of different persons is different, and the fault tolerance in respect of waterproof and preventing accidently triggering is relatively low. When a mobile smart device is placed in the pocket or when the screen is wet, accidently triggering is easy to occur. Such long term errors can affect the user's experience, and also increase overall power consumption.

SUMMARY

A main objective of the present invention is to provide a touch device and a method for performing fingerprint detection on the touch device, so as to enable rapid fingerprint sensing with low power consumption.

In order to achieve the above purposes, the present invention provides a touch device, which includes a touch plane configured to receive a user's touch; a detection unit fixed to the touch plane and configured to detect the user's touch; a fingerprint module fixed to the touch plane and configured to collect the user's fingerprint; and a control module configured to enable a fingerprint collection function of the fingerprint module when the detection unit detects that the touch plane is touched by the user, so as to collect the fingerprint of the user touched on the touch plane.

Optionally, in the touch device mentioned above, the detection unit is a pressure detection unit configured to detect the pressure generated by the user's touch. The touch plane to which the detection unit is fixed, is a pressure touch plane.

Optionally, the touch device mentioned above further includes: a first determining module configured to determine whether the pressure generated by the user's touch exceeds a pre-set threshold; the control module being configured to enable the fingerprint collection function of the fingerprint module when the pressure generated by the user's touch exceeds the pre-set threshold value, so as to collect the fingerprint of the user touched on the touch plane.

Optionally, in the touch device mentioned above, the detection unit is a mutual capacitive pressure detection unit which includes a driving electrode for transmitting a signal, a sensing electrode for receiving the signal, and a first calculation unit. When the touch plane deforms due to a user's touch, a variation of a distance between the driving electrode and sensing electrode causes a variation of capacitance, and affect strength of the signal received by the sensing electrode. The first calculation unit calculates a pressure generated by the user's touch according to the signal received by the sensing electrode.

Optionally, in the touch device mentioned above, the detection unit is a self-capacitance pressure detection unit including: an electrode for transmitting a signal, and a second calculation unit; the touch device has a device ground for receiving the signal. When the touch plane deforms due to the user's touch, the variation of the distance between the electrode and the device ground causes a variation of capacitance, and affect the strength of the signal received by the device ground; wherein the second calculation unit calculates the pressure generated by the user's touch according to the signal received by the drive ground.

Optionally, in the touch device mentioned above, the detection unit is a resistive pressure detection unit comprising a resistance wire and a third calculation unit; when the touch plane deforms due to the user's touch, the variation of the resistance wire causes a variation of resistance thereof, and affect the strength of the signal passing through the resistance wire; wherein the third calculation unit calculates the pressure generated by the user's touch according to the signal passing through the pressure detection unit.

Optionally, in the touch device mentioned above, the detection unit is configured to detect a region touched by the user.

Optionally, the touch device mentioned above further includes a second determination block configured to determine whether the area of the touch region of the user is within a pre-set range, and/or to determine whether the touch region of the user corresponds to the position of the fingerprint module; the second determination block is configured to enable a fingerprint collection function of the fingerprint block when a determination result of the second determination block is yes, so as to collect the fingerprint of the user touched on the touch plane.

Optionally, in the touch device mentioned above, the detection unit comprises: the detection unit comprises: a plurality of row electrodes, and a plurality of column electrodes arranged on the touch plane, and a fourth calculation unit. The row electrodes and column electrodes are vertically interlaced with each other, and each of the row electrodes and column electrodes is provided with a switch. A signal of an electrode under a region touched by the user when the switch corresponding to the electrode is switched on. The fourth calculation unit is configured to switch on the row electrodes and/or the column electrodes in a pre-set cycle, determine whether the touch plane is touched by a user according to the signals of the row electrodes and/or the column electrodes; and the fourth calculation unit is configured to switch on at least one of the row electrodes and at least one of the column electrodes according to a pre-set order, and determine the region touched by the user from the at least one of the row electrodes and the at least one of the column electrodes.

Optionally, the touch device mentioned above includes: a physical key arranged on a housing of the touch device and electrically connected with the control block; when the physical key is triggered, the control module enables the fingerprint module to collect the fingerprint of the user.

Optionally, the touch device mentioned above comprises: the touch plane is a touch pad or a touch screen.

The present invention also provides a method for performing fingerprint detection on a touch device. The touch device comprises: a touch plane configured to receive the user's touch; a detection unit fixed to the touch plane and configured to detect a user's touch; a fingerprint module fixed to the touch plane and configured to collect a user's fingerprint; the method comprises: detecting, by the detection unit, whether the touch plane is touched by the user; and enabling a fingerprint collection function of the fingerprint module when the detection unit detects that the touch plane is touched by the user, so as to collect the fingerprint of the user touched on the touch plane.

Optionally, in the method for performing fingerprint detection on a touch device, the detection unit is a pressure detection unit configured to detect the pressure generated by the user's touch; the touch plane to which detection unit is fixed, is a pressure touch plane.

Optionally, before enabling a fingerprint collection function of the fingerprint module so as to collect the fingerprint touched on the touch plane by the user, the method for performing fingerprint detection on a touch device further comprises: determining whether the pressure generated by the user's touch exceeds a pre-set threshold; enabling the fingerprint collection function of the fingerprint module when the pressure generated by the user's touch exceeds the pre-set threshold, so as to collect the fingerprint of the user touched on the touch plane.

Optionally, in the method for performing fingerprint detection on a touch device, the detection unit is configured to detect a touch region of the user.

Optionally, before enabling a fingerprint collection function of the fingerprint module so as to collect the fingerprint of the user touched on the touch plane, the method for performing fingerprint detection on a touch device further comprises: determining whether the area of the touch region of the user is within a pre-set range, and/or determining whether the touch region of the user corresponds to the position of the fingerprint module; enabling the fingerprint collection function of the fingerprint module when the determination result is yes, so as to collect the fingerprint of the user touched on the touch plane.

Optionally, in the method for performing fingerprint detection on a touch device, the touch plane is a touch pad or a touch screen.

According to the technical solutions mentioned above, the touch device and the method for performing fingerprint detection a touch device according to the present invention has at least the following advantages:

According to the technical solutions of the present invention, the fingerprint collection function of the fingerprint module is enabled after detecting by the detection unit that the user touches the touch plane, so as to collect the fingerprint of the user's touch on the touch plane. Moreover, the user only needs to perform the touch operation once in the overall process, and the fingerprint module is enabled only when the fingerprint of the user's touch on the touch plane, so that a problem of the relatively high power consumption for maintaining operation states of the fingerprint module for a very long time is solved.

Figure 1:
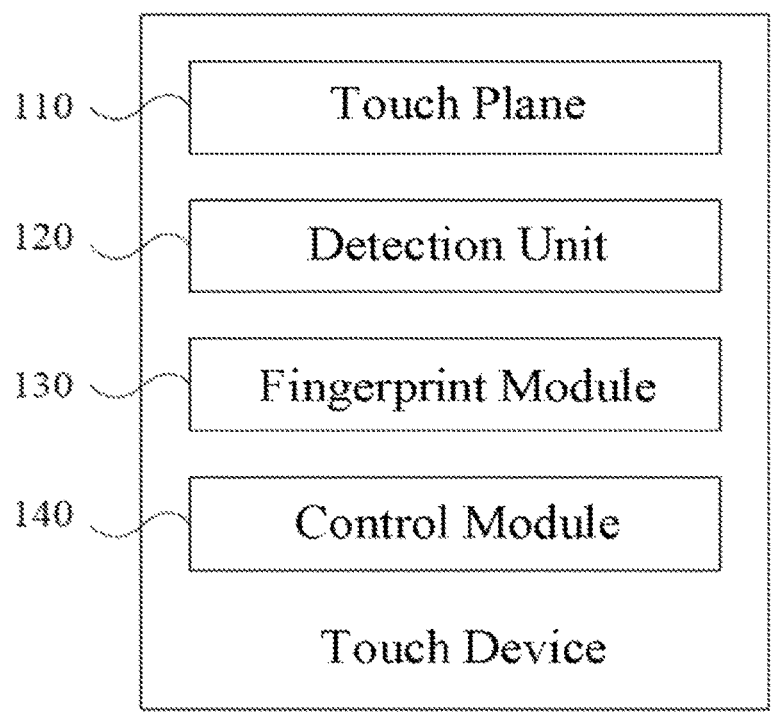
FIG. 1 is a block diagram of a touch device according to an embodiment of the present invention.

The implementation, the function features and advantages of the present invention are further described in combination with the embodiments by referring to the drawings.

DETAILED DESCRIPTION

It should be understood that the embodiments described herein in detail are only used to explain but not to limit the present invention.

Figure 2:
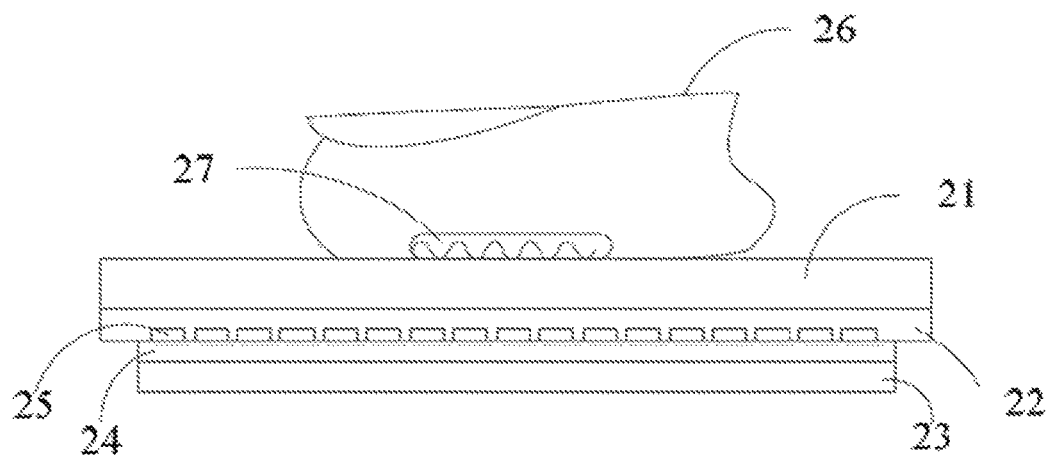
FIG. 2 is a partial section diagram of a touch device according to an embodiment of the present invention.
Figure 3:
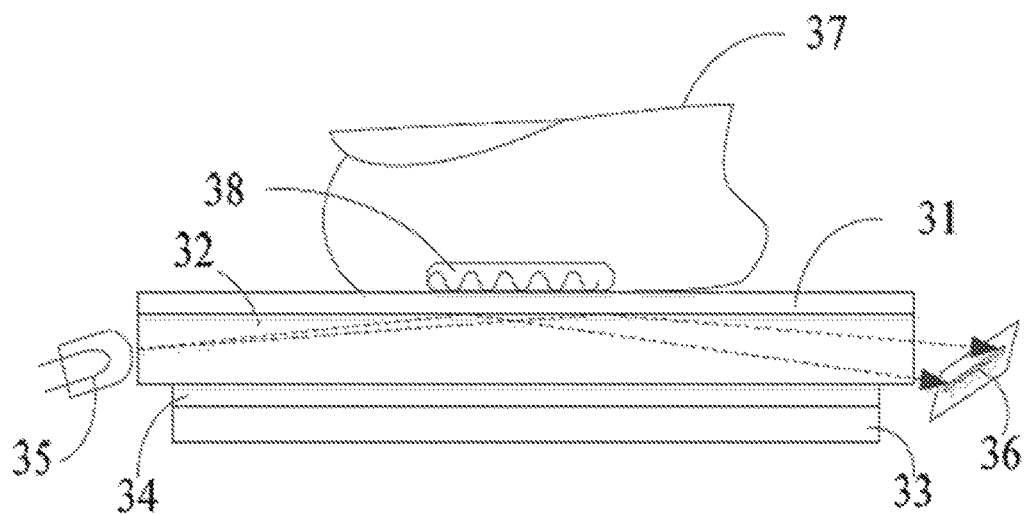
FIG. 3 is a partial section diagram of a touch device according to an embodiment of the present invention.
Figure 4:
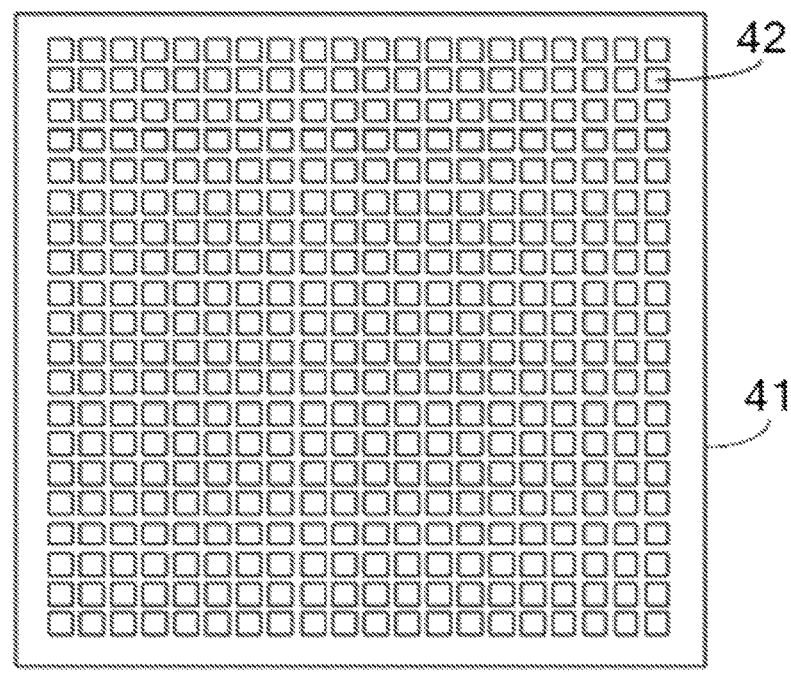
FIG. 4 is a schematic diagram of fingerprint module of a touch device according to an embodiment of the present invention.

As shown in FIG. 1, an embodiment of the present invention provides a touch device, the touch device comprises:

a touch plane 110 configured to receive a user's touch; in the present embodiment, the touch plane is a touch pad or a touch screen; the touch device includes a mobile phone, a tablet computer, a laptop or the like, which has a touch screen or a touch pad.

a detection unit 120 fixed to the touch plane 110 and configured to detect the user's touch; in the present embodiment, the way for the detection unit 120 detecting the user's touch is not limited; for instance, the detection unit 120 may detect variation of capacitance, variation of the resistance, pressure, temperature and the like.

a fingerprint module 130 fixed to the touch plane 110 and configured to collect a fingerprint of the user; in the present embodiment, the fingerprint module includes a plurality of sensing units, the sensing units are embedded within or arranged on the touch plane; the sensing units may be distributed in a certain region or an entire region of the touch plane, sensing data source of the sensing units may be capacitive data source, infrared spectrum data source, ultrasonic data source, or radar data source, but shall not be limited thereto, which is not limited. FIG. 2 is a schematic diagram illustrating a capacitive fingerprint module integrated with a touch pad; the touch pad includes an upper cover 21, a fingerprint sensing region 22, and a touch sensing region 23. The fingerprint sensing region 22 is fixed to the touch sensing region 23 by an adhesive 24; and a plurality of sensing units 25 are arranged in the fingerprint sensing region 22. When a fingerprint 27 of a user finger 26 contacts the upper cover 21 of the touch pad, a capacitance variation of the touch pad is raised, the sensing units 25 collect the fingerprint 27 of the user finger 26 according to the capacitance variation. FIG. 3 is a schematic diagram of the infrared spectrum fingerprint module integrated with a touch screen; the touch screen includes an upper glass cover 31, a lower glass cover 32 and a LCD layer 33, the LCD layer 33 is fixed to the lower glass cover 32 by an adhesive 34, infrared light emitted by a light source 35 is transferred in the lower glass cover 32, and is reflected on the upper surface of the lower glass cover 32. The reflected infrared light is received by the sensing units 36. When a fingerprint 38 of a user finger 37 touches the upper glass cover 31 of the touch pad, the reflection of the infrared light by the lower glass cover 32 may be affected, and the sensing units 36 collect the fingerprint 38 of a finger 37 according to the reflected infrared light. As shown in FIG. 4, a sensing unit 42 in a fingerprint module 41 not only represents a coordinate of the physical sensing unit 42, but also illustrates a respective arrangement of an original sensing value detected by the sensing units 42 in a system. The sensing unit 42 according to the present embodiment represents the original sensing value in the system, and the sensing source is not limited to capacitive source, infrared source, and ultrasonic source.

a control module 140 configured to enable a fingerprint collection function of the fingerprint module 130 when the detection unit 120 detects that the touch plane 110 is touched by the user, so as to collect the fingerprint of the user touched on the touch plane. According to the technical solution of the present embodiment, the user only needs to perform the touch operation once in an overall process, and the fingerprint module 130 is enabled only when the fingerprint of the user touches the touch plane 120, so that the problem of high power consumption for maintaining operation states of fingerprint module for very long time is solved.

Figure 5:
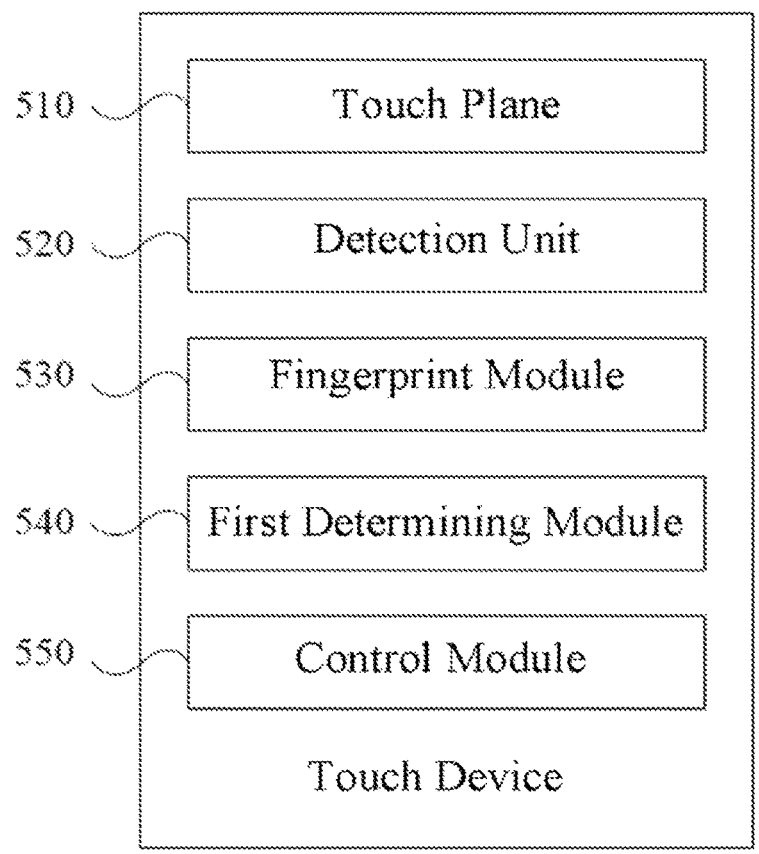
FIG. 5 is a block diagram of a touch device according to an embodiment of the present invention.

As shown in FIG. 5, an embodiment of the present invention provides a touch device which comprises:

a touch plane 510 configured to receive a user's touch.

a detection unit 520 fixed to the touch plane 510 and configured to detect the user's touch. The detection unit 520 is a pressure detection unit configured to detect a pressure generated by the user's touch; the touch plane 510, to which the detection unit 520 is fixed, is a pressure touch plane. In the present embodiment, a touch screen or a touch pad with pressure sensing may be referred to as the pressure touch plane, which is used more and more widely. A detection for pressure value in a vertical screen direction is added to the pressure touch plane on the basis of a normal touch screen or touch pad; accordingly, the previous touch screen or touch pad is upgraded to 3D touching from 2D sliding, such that the fingerprint scanning function is enabled by using the pressure touch plane.

a fingerprint module 530 fixed to the touch plane 510 and configured to collect a fingerprint of the user.

a first determining module 540 configured to determine whether the pressure generated by the user's touch exceeds a pre-set threshold, after the detection unit 520 detects that the touch plane 510 is touched by the user. In the present embodiment, a simple pressure detection is performed, and the intention of the user is recognized according to the pressure detection, to determine whether the user's touch is a normal touch for enabling the fingerprint collecting operation or an accidental touch. In the case of accidental touch, the fingerprint scanning is not enabled; thereby, a level for recognizing the user's pressing action is relatively high. In the present embodiment, a fingerprint scanning function is enabled after a pressure is applied by the finger to achieve that the fingerprint scanning is enabled by pressing the touching plane in a touch mode. Thus, there is no need to light up the touch screen, and the power consumption is decreased.

a control module 550 configured to enable the fingerprint collection function of the fingerprint module when the pressure generated by the user's touch exceeds the pre-set threshold value, so as to collect the fingerprint of the user touched on the touch plane.

The pressure detection method described in the present embodiment is not limited to capacitive and resistive pressure detections. In addition, the capacitive pressure detection generally includes two types: self-capacitive pressure detection and mutual-capacitive pressure detection.

Figure 6:
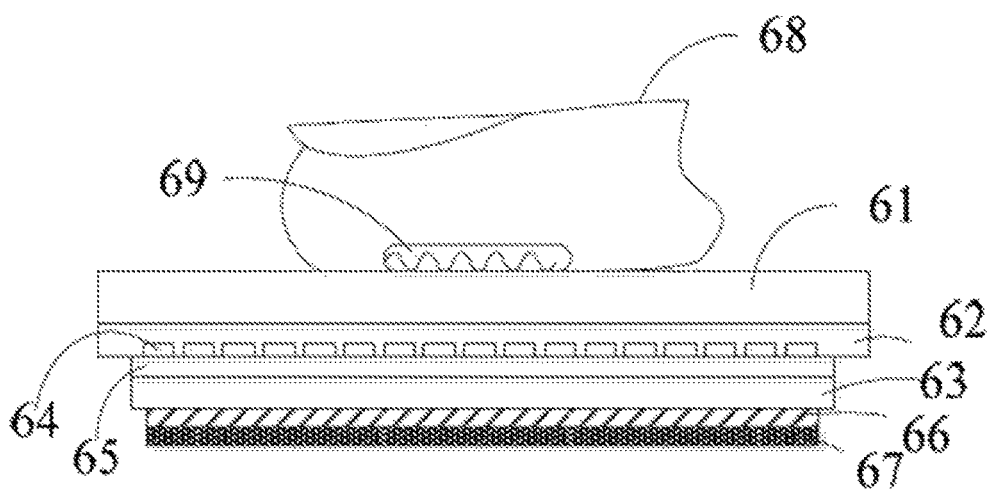
FIG. 6 is a partial section diagram of a touch device according to an embodiment of the present invention.
Figure 7:
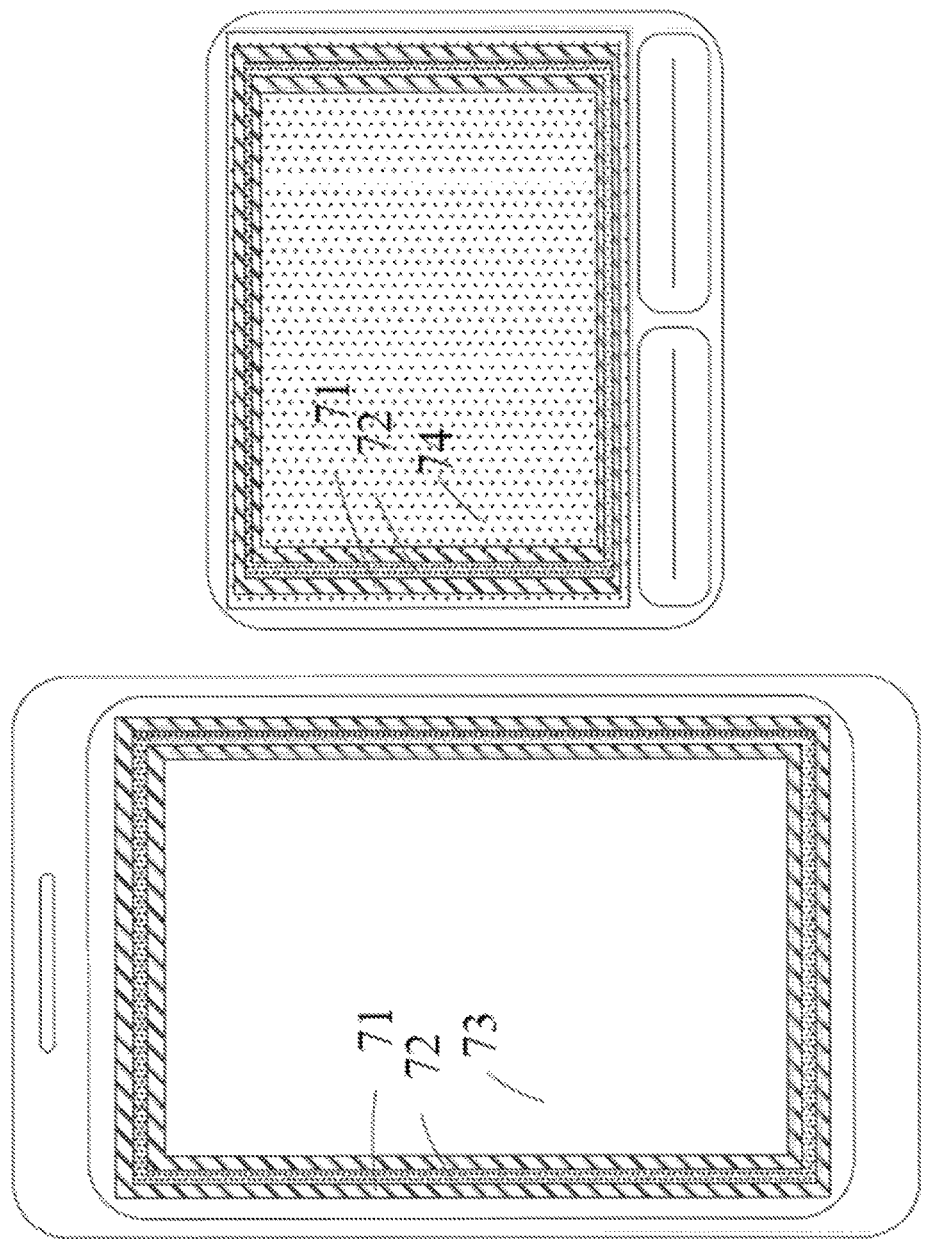
FIG. 7 is a schematic diagram of a touch device according to an embodiment of the present invention.

A mutual capacitive pressure detection unit includes: a driving electrode for transmitting a signal, a sensing electrode for receiving the signal, and a first calculation unit. When the touch plane deforms due to a user's touch, a variation of a distance between the driving electrode and sensing electrode causes a variation of capacitance, and affect strength of the signal received by the sensing electrode. The first calculation unit calculates a pressure generated by the user's touch according to the signal received by the sensing electrode. FIG. 6 illustrates a touch pad adopting the capacitive pressure detection unit, in addition to a upper cover 61, a fingerprint sensing region 62, a touch sensing region 63, a sensing units 64 and an adhesive 65, the touch pad further includes a mutual-capacitive pressure detection unit mounted under a touch plane, which has a pressure driving electrode 66 and a sensing electrode 67. The signal is transmitted by the driving electrode 66 and then received by the sensing electrode 67. When a pressure is applied to the touch plane, a distance between the driving electrode 66 and the sensing electrode 67 slightly changes, and a sensing capacitance changes accordingly, thereby, the pressure can be distinguished. The driving electrode and sensing electrode are normally configured as homocentric squares, and details thereof are shown in FIG. 7. The driving electrode 71 and the sensing electrode 72, which are configured as homocentric squares, are provided on both a touch screen 73 and a touch pad 74; alternatively, the driving electrode 71 and the sensing electrode 72 could be formed as a plane covering the touch plane.

A self-capacitive pressure detection unit includes: an electrode for transmitting a signal, and a second calculation unit; the touch device has a device ground for receiving the signal. When the touch plane deforms due to a user's touch, a variation of a distance between the driving electrode and the device ground, and a capacitance variation is reflected, and affect strength of the signal received by the device ground. The second calculation unit calculates a pressure generated by the user's touch according to the signal received by the device ground. In the present embodiment, the pressure detection unit only has one electrode which is near the device ground. When a pressure is applied to the touch plane, a distance between pressure electrode and the device grounds lightly changes, and a sensing capacitance changes accordingly; thereby, the pressure can be distinguished.

Figure 8:
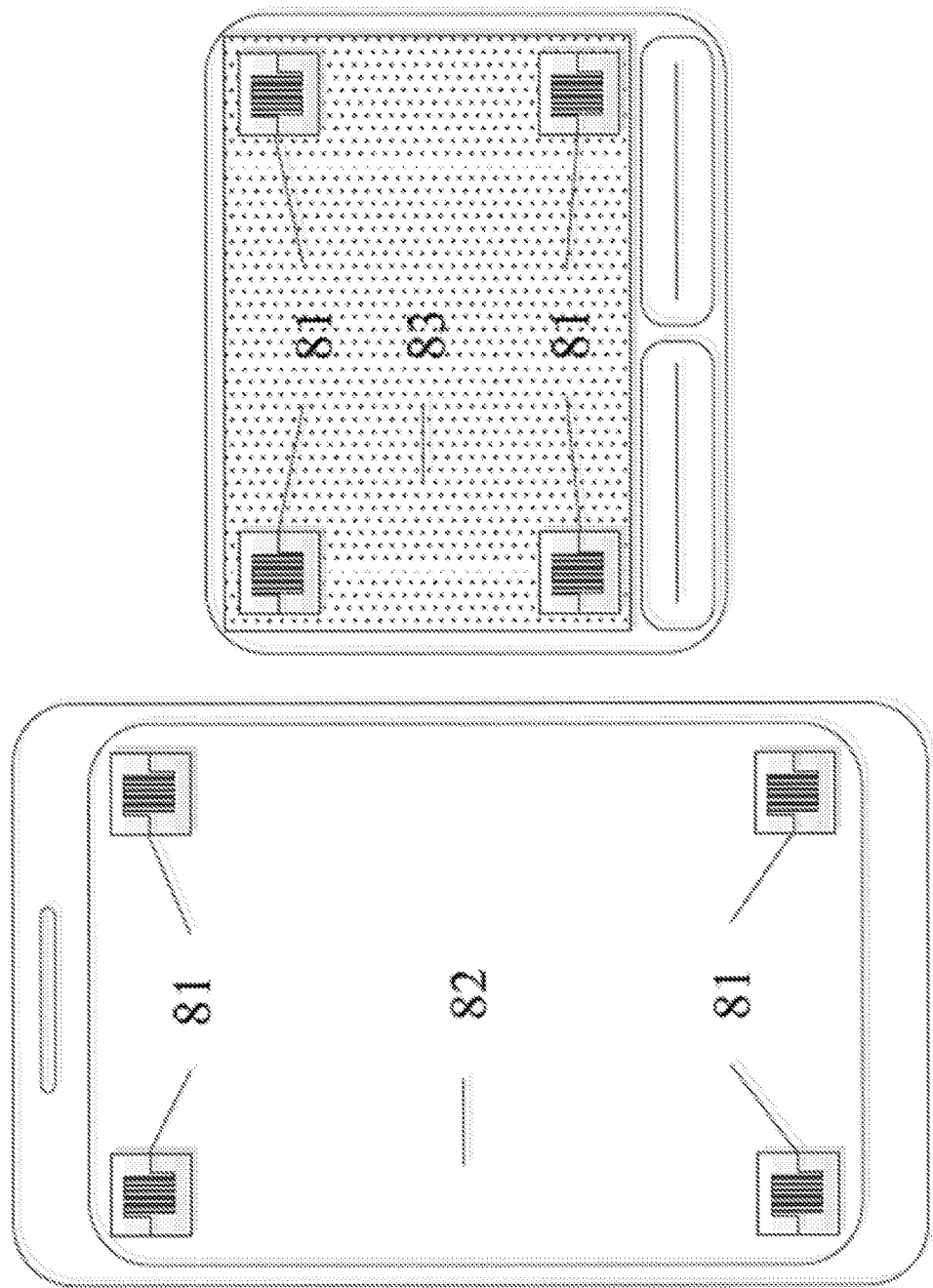
FIG. 8 is a schematic diagram of a touch device according to an embodiment of the present invention.

A resistive pressure detection unit includes: a resistance wire and a third calculation unit. When the touch plane deforms due to a user's touch, a variation of the resistance wire causes a variation of resistance thereof, and affect strength of a signal passing through the resistance wire. The third calculation unit calculates a pressure generated by the user's touch according to the signal passing through the pressure detection unit. In the present embodiment, resistance detection units deform due to the pressure applied on the touch plane, and positions and number of the resistive pressure detection units is determined based on a size of the touch plane. A shown in FIG. 8, the resistive pressure detection units 81 are arranged on both a touch screen 82 and a touch pad 83.

According to the technical solutions of the present embodiment, in a mobile touch device with a touch screen or a touch pad having the pressure detection unit, the pressure touch plane acts like a non-stoke button and functions as a trigger for enabling the fingerprint scanning function. The fingerprint scanning function is enabled after a pressure is applied to the pressure touch plane, so as to solve the problem of high power consumption for maintaining operation states of the fingerprint module for long time.

Additionally, on the basis of the above embodiments, the touch device further includes: a physical key arranged on a housing of the touch device and electrically connected with the control module; when the physical key is triggered, the control module enables the fingerprint module to collect the fingerprint of the user. A shape and a position of the physical key is not limited; for instance, the physical key may be arranged on aback shell of the touch device, which is opposite to the screen. When the user presses the physical key by a finger, the fingerprint module is enabled to collect the fingerprint of the user.

Figure 9:
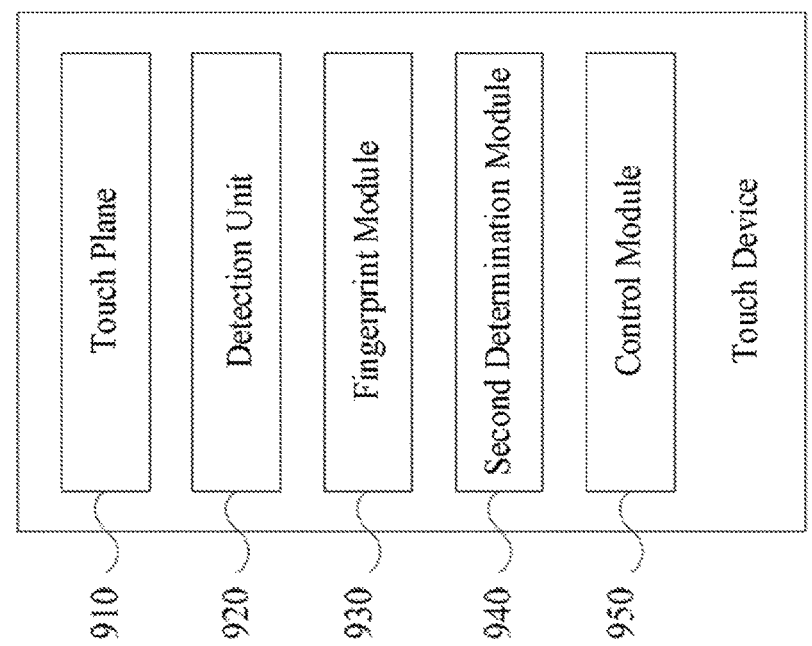
FIG. 9 is a block diagram of a touch device according to an embodiment of the present invention.

As shown in FIG. 9, an embodiment of the present invention provides a touch device which includes:

a touch plane 910 configured to receive a user's touch.

a detection unit 920 fixed to the touch plane 910 and configured to detect the user's touch. The detection unit 920 is configured to detect a touch region of the user. In the present embodiment, when the touch device is in a touch mode, the detection unit 920 is first used to roughly detect the touch region of a finger. After determining that the finger has performed a pressing operation, a fingerprint scanning function is enabled.

a fingerprint module 930 fixed to the touch plane 910 and configured to collect a fingerprint of the user.

a second determination module 940 configured to determine whether an area of the touch region of the user is within a pre-set range, and/or to determine whether the touch region of the user corresponds to a position of the fingerprint module, when the detection unit 920 detects that the touch plane 910 is touched by the user. In the present embodiment, during activation of the fingerprint module 930, some processes for preventing accidental triggering are added, including finger locating, recognition of user's pressing action based on a pressing area thereof. For instance, if the fingerprint module is arranged at an edge of the screen, when determining a pressing position of the user's pressing action is not above the fingerprint module, the user's pressing action is determined as an inaccurate pressing or an accidental touch, and no process will be performed. If the fingerprint module covers the entire screen, the determination is neglected. An effective touch area of a finger can be roughly obtained based on determination of the pressing position. When the touch area is too small (when being touched by a nib and the like) or too large (when being touched by a palm or other parts of the skin), the pressing action is determined as a non-finger touch or an inaccurately touch, and no process will be performed. It is clear that according to the technical solutions of the present embodiment, the level for recognizing the pressing action of the user is relatively high.

a control module 950 configured to enable a fingerprint collection function of the fingerprint module 930 when a determination result of the second determination 940 is yes, so as to collect the fingerprint of the user touched on the touch plane 910.

Figure 10:
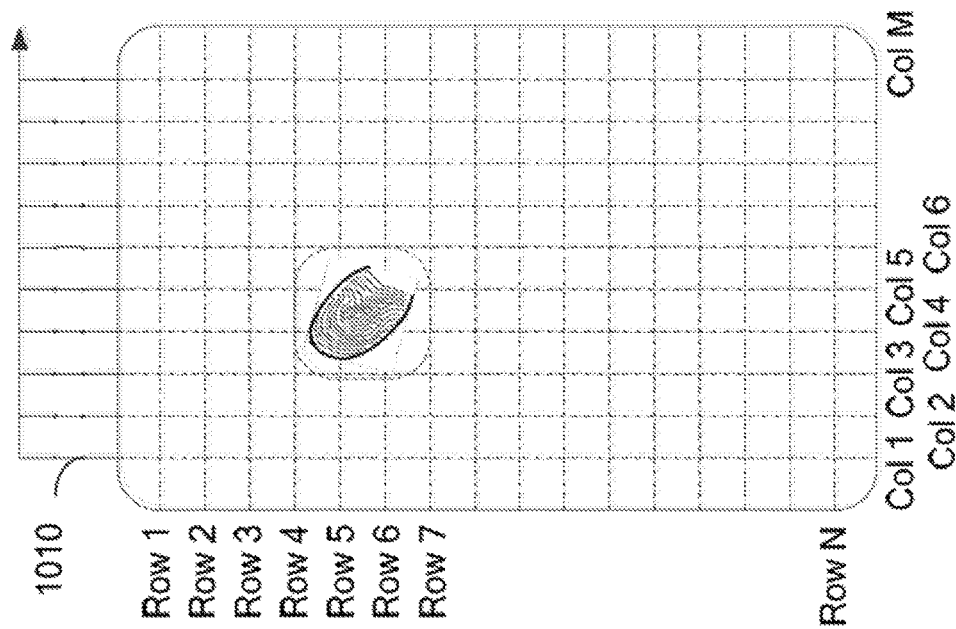
FIG. 10 is an operating schematic diagram of a touch device according to an embodiment of the present invention.
Figure 11:
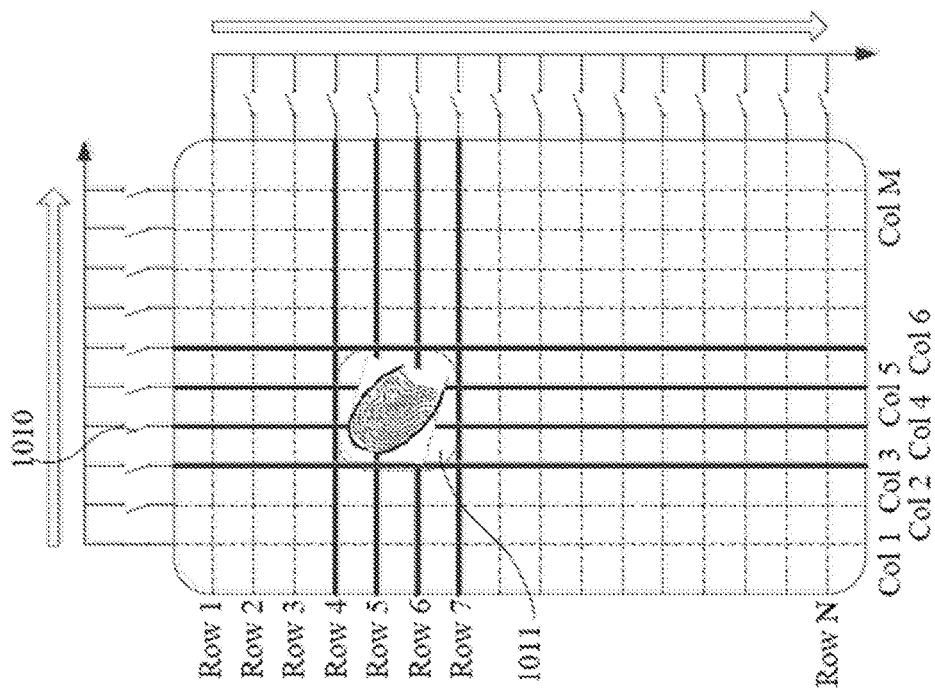
FIG. 11 is an operating schematic diagram of a touch device according to an embodiment of the present invention.

The detection unit 920 includes: a plurality of row electrodes, and a plurality of column electrodes arranged on the touch plane, and a fourth calculation unit. The row electrodes and column electrodes are vertically interlaced with each other, and each of the row electrodes and column electrodes is provided with a switch. A signal of an electrode under a region touched by the user when the switch corresponding to the electrode is switched on. The fourth calculation unit is configured to switch on the row electrodes and/or the column electrodes in a pre-set cycle, determine whether the touch plane is touched by a user according to the signals of the row electrodes and/or the column electrodes; and moreover, the fourth calculation unit is also configured to switch on at least one of the row electrodes and at least one of the column electrodes according to a pre-set order, and determine the region touched by the user from the at least one of the row electrodes and the at least one of the column electrodes. In the present embodiment, taking a capacitive touch screen or touch pad as an example, when the touch screen is in a cold screen mode or the touch pad is not activated, the fingerprint module is switched off, and the capacitive touch screen or the touch pad periodically switches on the switches of the electrodes for scanning. As shown in FIG. 10, in order to determine whether a touch exists, all switches 1010 may be completely switches on. When a finger touches on anywhere of the screen, a process for triggering position determination as shown in FIG. 11 starts. When the touch plane is touched by a finger, as shown in detail in FIG. 11, a row-column interval scanning is enabled. Several switches among all switches 1010 are switched on sequentially in an order as shown by an arrow of FIG. 11 (the switches 1010 corresponding to several rows or columns illustrated as bold lines in FIG. 11 are to be switched on). The sensing values correspond to rows and columns touched by a finger may change, as a result, a location of a touch region 1011 may be roughly detected, thereby the position of the finger may be located.

Figure 12:
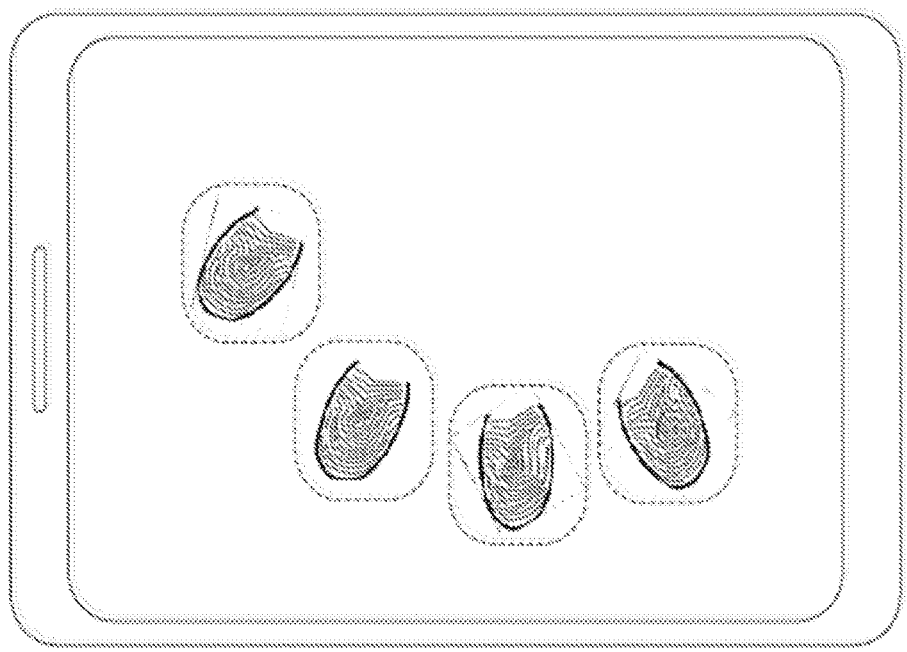
FIG. 12 is a schematic diagram of a touch device according to an embodiment of the present invention.
Figure 13:
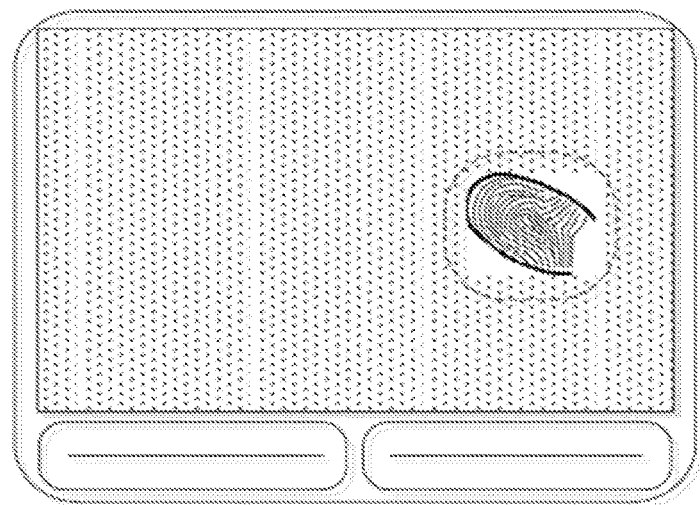
FIG. 13 is a schematic diagram of a touch device according to an embodiment of the present invention.

According to the embodiments mentioned above, the touch device for triggering fingerprint collection by a pressing action of a user is implemented, and the detailed using illustration of the touch device are indicated in the FIG. 12 and FIG. 13. The touch device in FIG. 12 adopts a touch screen and a fingerprint module is provided under the entire touch screen. Thereby, a fingerprint of the user may be collected when the user presses any of a plurality of positions of the touch screen. The touch device shown in FIG. 13 adopts a touch pad and the fingerprint module is provided in a specific region of the touch pad. Therefore, the fingerprints may be collected when the user presses the specific region of the touch pad.

Figure 14:
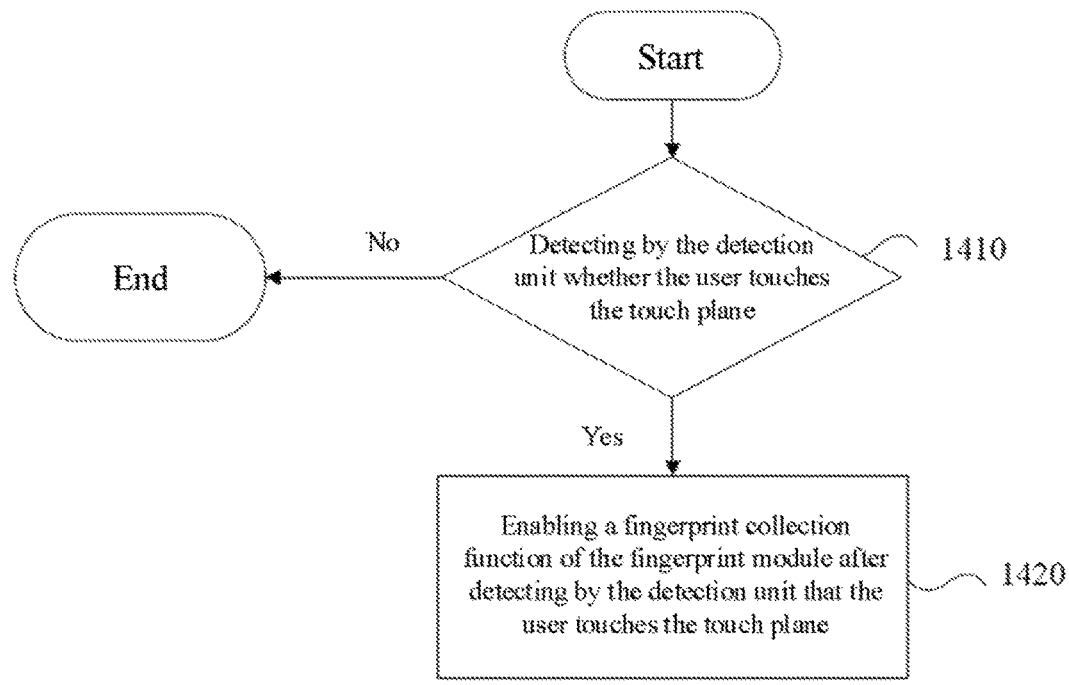
FIG. 14 is a flow diagram of a method for performing fingerprint detection on a touch device according to an embodiment of the present invention.

As shown in FIG. 14, an embodiment of the present invention provides a method for performing fingerprint detection on a touch device. The touch device includes: a touch plane configured to receive a user's touch, a detection unit fixed to the touch plane and configured to detect the user's touch, a fingerprint module fixed to the touch plane and configured to collect the user's fingerprint. The method includes:

Step 1410, detecting, by the detection unit, whether the user touches the touch plane. In the present embodiment, the touch plane may be a touch pad or a touch screen; the touch device includes a mobile phone, a tablet computer, a laptop or the like, which has a touch screen or a touch pad. In the present embodiment, the method for detecting the user's touch by the detection unit is not limited, for example, the detection unit may detect capacitance variation, resistance variation, pressure, temperature and the like when the user touches the touch plane.

Step 1420, enabling a fingerprint collection function of the fingerprint module when the detection unit detects that the touch plane is touched by the user. In the present embodiment, the fingerprint module includes a plurality of sensing units, the sensing units are embedded in or arranged on the touch plane; the sensing units may be distributed in a certain region or an entire region of the touch plane, and a sensing data source of the sensing units may be a capacitive data source, an infrared spectrum data source, an ultrasonic data source, or a radar data source, which is not limited.

According to the technical solutions of the present embodiment, the user only needs to perform the touch operation once in an overall process, and the fingerprint module is enabled only when the fingerprint of the user touches the touch plane, so that a problem of the relatively high power consumption for maintaining operation states of the fingerprint module for a very long time is solved.

Figure 15:
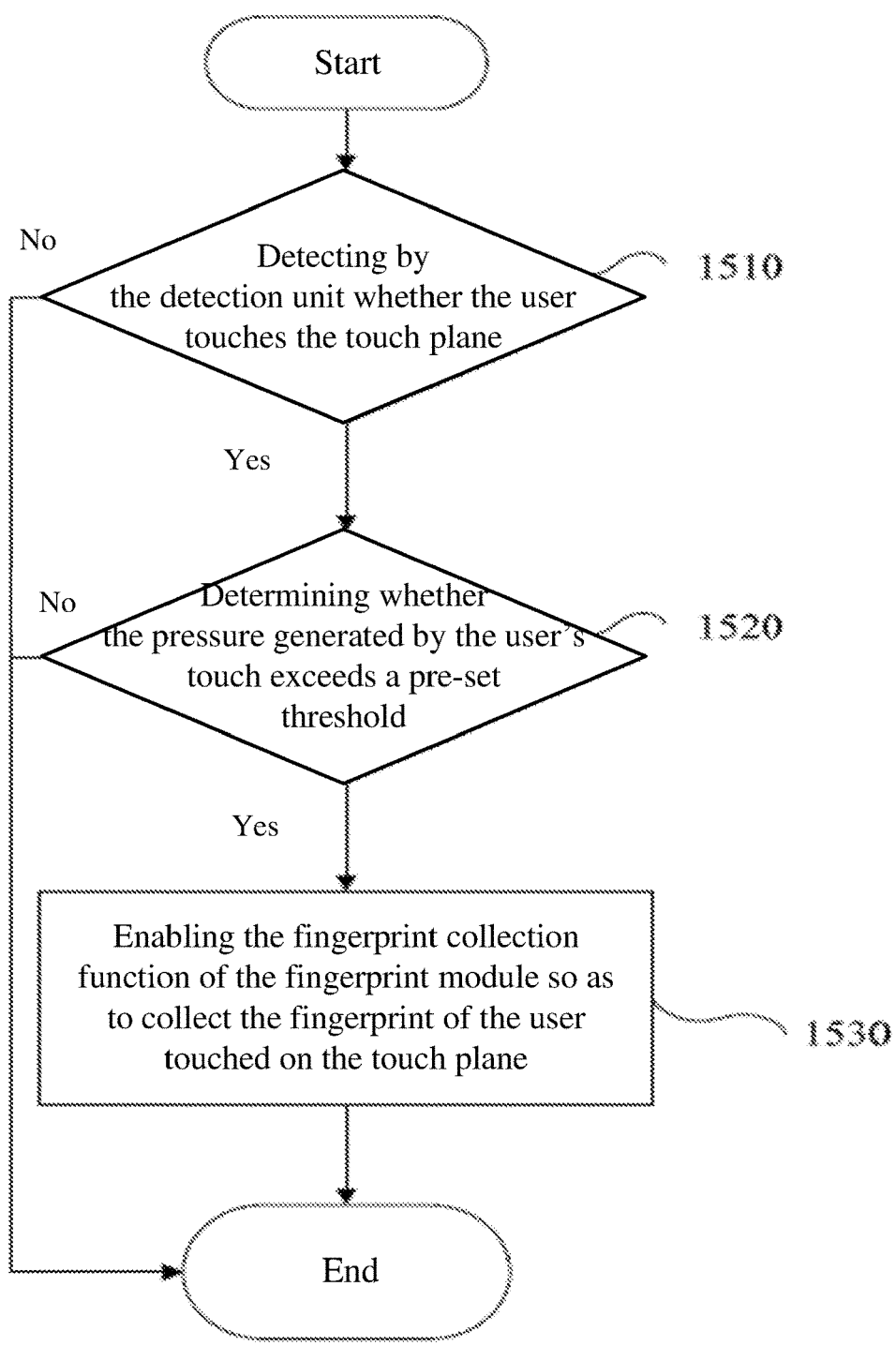
FIG. 15 is a flow diagram of a method for performing fingerprint detection on a touch device according to an embodiment of the present invention.

As shown in FIG. 15, an embodiment of the present invention provides a method for performing the fingerprint detection on a touch device. The touch device includes: a touch plane configured to receive the user's touch; a detection unit fixed to the touch plane and configured to detect the user's touch; and a fingerprint module fixed to the touch plane and configured to collect the user's fingerprint. The detection unit is a pressure detection unit configured to detect the pressure generated by the user's touch, and the touch plane to which the detection unit is fixed, is a pressure touch plane. In the present embodiment, the touch screen and the touch pad with pressure sensing may be referred to as a pressure touch plane which is used more and more widely. Detection for pressure value in a vertical screen direction is added to the pressure touch plane on the basis of the normal touch screen or touch pad. Accordingly, the previous touch screen or touch pad is upgraded to 3D touching from 2D sliding, such that the fingerprint scanning function is enabled by using the pressure touch plane. The method of the present embodiment includes:

Step 1510, detecting, by the detection unit, whether the user touches the touch plane.

Step 1520, determining whether the pressure generated by the user's touch exceeds a pre-set threshold when the detection unit detects that the touch plane is touched by the user. In the present embodiment, a simple pressure detection is performed, and the intention of the user is recognized according to the pressure detection, to determine whether the user's touch is a normal touch for enabling the fingerprint collecting operation or an accidental touch. In the case of accidental touch, the fingerprint scanning is not enabled; thereby, a level for recognizing the user's pressing action is relatively high. In the present embodiment, a fingerprint scanning function is enabled after a pressure is applied by the finger, to implement that the fingerprint scanning is enabled by pressing the touching plane in a touch mode, and thus there is no need to light up the touch screen, so that the power consumption is decreased.

Step 1530, if the pressure generated by the user's touch exceeds the pre-set threshold value, enabling the fingerprint collection function of the fingerprint module, so as to collect the fingerprint of the user touched on the touch plane.

According to the technical solutions of the present embodiment, in a mobile touch device with a touch screen or a touch pad having the pressure detection unit, the pressure touch plane acts like a non-stoke button and functions as a trigger source for enabling the fingerprint scanning function. The fingerprint scanning function is enabled after a pressure is applied to the pressure touch plane, so as to solve the problem of high power consumption for maintaining operation states of the fingerprint module for long time.

Figure 16:
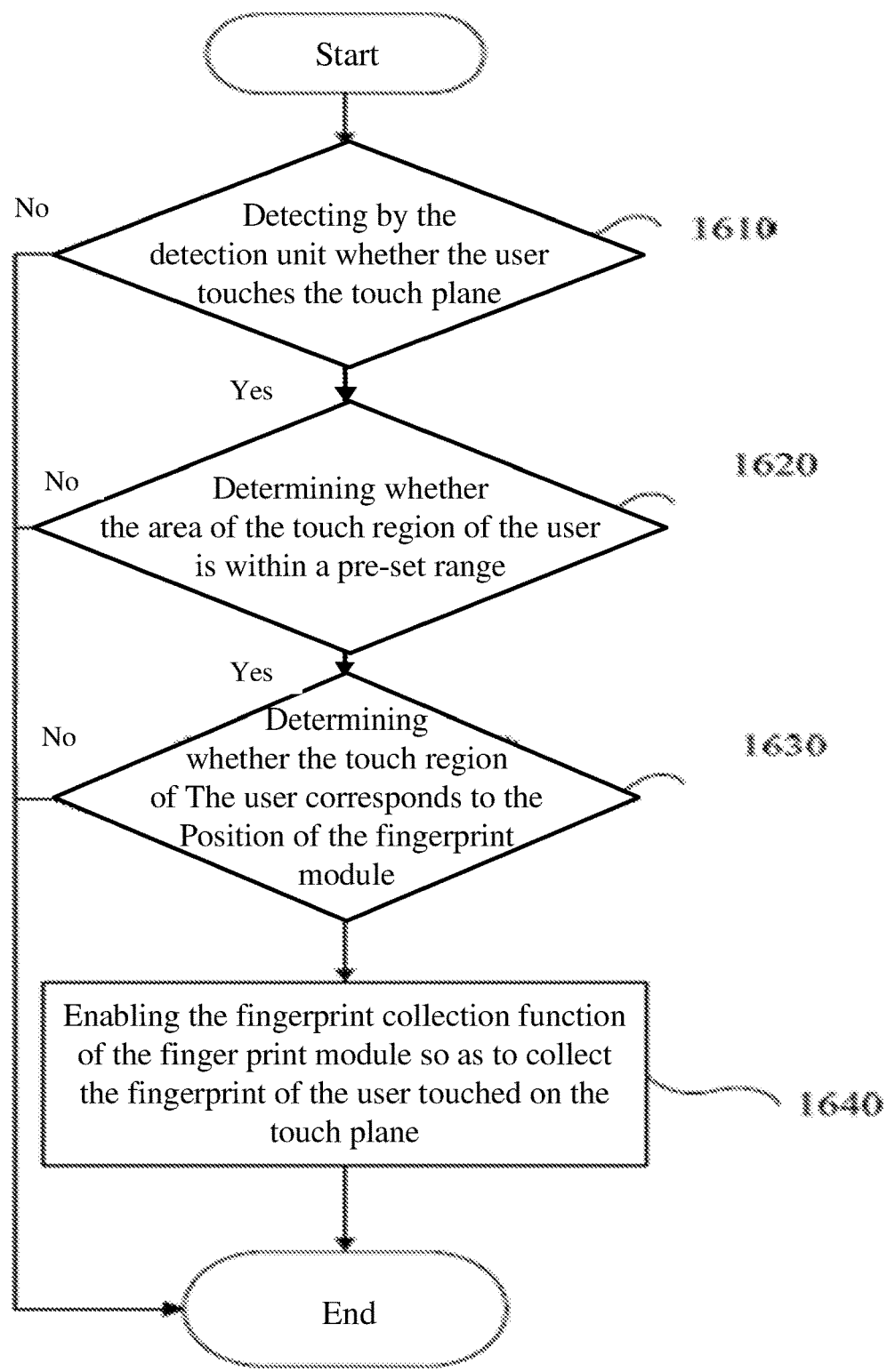
FIG. 16 is a flow diagram of a method for performing fingerprint detection on a touch device according to an embodiment of the present inventions.

As shown in FIG. 16, an embodiment of the present invention provides a method for performing fingerprint detection on a touch device. The touch device includes: a touch plane configured to receive the user's touch; a detection unit fixed to the touch plane and configured to detect the user's touch; and a fingerprint module fixed to the touch plane and configured to collect the user's fingerprint. In the present embodiment, when the touch device is in a touch mode, the detection unit 920 is first used to roughly detect the touch region of a finger. After determining that the finger has performed a pressing operation, a finger print scanning function is enabled, a fingerprint module fixed to the touch plane and configured to collect the user's fingerprint.

Step 1610, detecting, by the detection unit, whether the user touches the touch plane.

Step 1620, determining whether the area of the touch region of the user is within a pre-set range when the detection unit detects that the touch plane is touched by the user.

Step 1630, determining whether the touch region of the user corresponds to the position of the fingerprint module when a determination result is yes. In the present embodiment, during activation of the fingerprint module 930, some processes for preventing accidental triggering are added, including finger locating, recognition of user's pressing action based on a pressing area thereof. For instance, if the fingerprint module is arranged at an edge of the screen, when determining a pressing position of the user's pressing action is not above the fingerprint module, the user's pressing action is determined as an inaccurate pressing or an accidental touch, and no process will be performed. If the fingerprint module covers the entire screen, the determination is neglected. An effective touch area of a finger can be roughly obtained based on determination of the pressing position. When the touch area is too small (when being touched by a nib and the like) or too large (when being touched by a palm or other parts of the skin), the pressing action is determined as a non-finger touch or an inaccurately touch, and no process will be performed. It is clear that according to the technical solutions of the present embodiment, the level for recognizing the pressing action of the user is relatively high.

Step 1640, enabling the fingerprint collection function of the fingerprint module, when the determination result is yes, so as to collect the fingerprint of the user touched on the touch plane.

It needs to be noted that the terms "includes", "comprises" or any other variations having the meaning tends to cover non-exclusive containing. As a result, a process, a method, an object or a device including a series of elements not only includes those elements, but also includes other elements not listed specifically or also includes elements inherent in the process, a method, an object or a device. When an element is limited by the sentence "includes a . . . " and no further limitation is limited thereto, other same elements may also be included in the process, method, object or device having the element.

The sequential numbers of the embodiments of the present invention mentioned above are merely for description, instead of representing advantages and disadvantage.

According to the description of the embodiments mentioned above, the person skill in the art may clearly understand that those embodiments mentioned above may be implemented by the software together with essential general hardware platform, or be implemented by hardware. However, in the most situations, the former is preferred. The part of technical solution of the present invention that contributes to the prior art may be essentially implemented by the software. The computer software product is stored in a storage medium (for instance, ROM/RAM, a disc, a disk), it includes several instructions so that a terminal device may execute the method described in each embodiment of the present invention by a terminal device (for instance, may be a phone, a computer, server, air-conditioner, or an internet device and the like).

The embodiments mentioned above are all preferable embodiments in the present invention but shall not be construed as limitations to the present invention. Any equivalent variation for the structure or process made according to the description and the drawings of the invention or direct or indirect applications to other related technical field are also within the scope of protection of the present invention.

What is claimed is:

1. A touch device, comprising:
 a touch plane configured to receive a touch of a user;
 a detection unit comprising a touch sensor configured to detect the user's touch;
 a fingerprint module comprising a fingerprint sensor fixed to the touch plane and configured to collect a fingerprint of the user; and
 a processor for executing computer-executable instructions stored in a non-transitory storage medium, when the computer-executable instructions are executed, the processor enables the fingerprint module to collect the fingerprint of the user's touch on the touch plane, when the detection unit detects that the touch plane is touched by the user;
 wherein the detection unit is further configured to detect a touch region of the user;
 the processor is further configured to determine whether the area of the touch region of the user is within a pre-set range, and/or to determine whether the touch region of the user corresponds to the position of the fingerprint module, and enable a fingerprint collection function of the fingerprint module so as to collect the fingerprint of the user touched on the touch plane, when a determination result is positive;
 wherein the detection unit comprises: a plurality of row electrodes, and a plurality of column electrodes arranged on the touch plane, and a fourth calculation unit;
 wherein the row electrodes and column electrodes are vertically interlaced with each other, and each of the row electrodes and column electrodes is provided with a switch,
 wherein a signal of an electrode under a region touched by the user varies when the switch corresponding to the electrode is switched on;
 wherein the fourth calculation unit is configured to:
 switch on the row electrodes and/or the column electrodes in a pre-set cycle,
 determine whether the touch plane is touched by a user according to the signals of the row electrodes and/or the column electrodes;

switch on at least one of the row electrodes and at least one of the column electrodes according to a pre-set order, and determine the region touched by the user from the at least one of the row electrodes and the at least one of the column electrodes.

2. The touch device according to claim 1, wherein the detection unit is a pressure detection unit configured to detect the pressure generated by the user's touch; the touch plane to which the detection unit is fixed is a pressure touch plane.

3. The touch device according to claim 2, wherein, the processor is further configured to determine whether the pressure generated by the user's touch exceeds a pre-set threshold; and the processor enables the fingerprint collection function of the fingerprint module so as to collect the fingerprint of the user's touch on the touch plane, when the pressure generated by the user's touch exceeds the pre-set threshold.

4. The touch device according to claim 2, wherein the detection unit is a mutual capacitive pressure detection unit which comprises a driving electrode for transmitting a signal, a sensing electrode for receiving the signal, and a first calculation unit; when the touch plane deforms due to a user's touch, a variation of a distance between the driving electrode and sensing electrode causes a variation of capacitance, and affect strength of the signal received by the sensing electrode; wherein the first calculation unit calculates a pressure generated by the user's touch according to the signal received by the sensing electrode.

5. The touch device according to claim 2, wherein the detection unit is a self-capacitance pressure detection unit which comprises an electrode for transmitting a signal and a second calculation unit; the touch device has a device ground for receiving the signal; when the touch plane deforms due to the user's touch, the variation of the distance between the driving electrode and the device ground, and a capacitance variation is reflected, and affect the strength of the signal received by the device ground; wherein the second calculation unit calculates the pressure generated by the user's touch according to the signal received by the drive ground.

6. The touch device according to claim 2, wherein the detection unit is a resistive pressure detection unit comprising a resistance wire and a third calculation unit; when the touch plane deforms due to the user's touch, the variation of the resistance wire causes a variation of resistance thereof, and affect the strength of the signal passing through the resistance wire; wherein the third calculation unit calculates the pressure generated by the user's touch according to the signal passing through the pressure detection unit.

7. The touch device according to claim 1, further comprising:

a physical key arranged on a housing of the touch device and electrically connected with the processor, wherein the processor enables the fingerprint module to collect the fingerprint of the user when the physical key is triggered.

8. The touch device according to claim 1, wherein the touch plane is a touch pad or a touch screen.

9. A method for performing fingerprint detection on a touch device, the touch device comprising a touch plane configured to receive a touch of a user, a detection unit configured to detect the user's touch, a fingerprint module fixed to the touch plane and configured to collect the user's fingerprint; wherein the method comprises:

detecting, by the detection unit, whether the touch plane is touched by the user; and enabling the fingerprint module to collect the fingerprint of a user's touch on the touch plane when the detection unit detects that the touch plane is touched by the user;

wherein, the method further comprises detecting by the detection unit a touch region of the user; and determining, before enabling the fingerprint module to collect the fingerprint of the user's touch on the touch plane, whether the area of the touch region of the user is within a pre-set range, and/or determining whether the touch region of the user corresponds to the position of the fingerprint module, and enable the fingerprint module to collect the fingerprint of the user's touch on the touch plane when the determination result is positive, wherein the detection unit comprises: a plurality of row electrodes, and a plurality of column electrodes arranged on the touch plane, wherein the row electrodes and column electrodes are vertically interlaced with each other, each of the row electrodes and column electrodes is provided with a switch, and a signal of an electrode under a region touched by the user varies when the switch corresponding to the electrode is switched on;

wherein, the method further comprises:

switching on the row electrodes and/or the column electrodes in a pre-set cycle, determining whether the touch plane is touched by a user according to the signals of the row electrodes and/or the column electrodes;

switching on at least one of the row electrodes and at least one of the column electrodes according to a pre-set order, and determining the region touched by the user from the at least one of the row electrodes and the at least one of the column electrodes.

10. The method for performing fingerprint detection on a touch device according to the claim 9, wherein the detection unit is a pressure detection unit configured to detect the pressure generated by the user's touch; wherein the touch plane to which detection unit is fixed is a pressure touch plane.

11. The method for performing fingerprint detection on a touch device according to the claim 10, wherein before enabling the fingerprint module to collect the fingerprint of the user's touch on the touch plane, the method further comprises:

determining whether the pressure generated by the user's touch exceeds a pre-set threshold;

enabling the fingerprint module to collect the fingerprint of the user's touch on the touch plane when the pressure generated by the user's touch exceeds the pre-set threshold.

12. The method for performing fingerprint detection on a touch device according to claim 9, wherein the touch plane is a touch pad or a touch screen.

* * * * *